United States Patent
Li et al.

(10) Patent No.: US 10,440,729 B2
(45) Date of Patent: Oct. 8, 2019

(54) TRANSMISSION OF ULTRA-RELIABLE LOW-LATENCY COMMUNICATIONS (URLLC) OVER TIME DIVISION DUPLEX (TDD) USING A URLLC CONFIGURATION FOR A TDD SUBFRAME

(71) Applicant: QUALCOMM Incorporated, San Diego, CA (US)

(72) Inventors: Chih-ping Li, San Diego, CA (US); Jing Jiang, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 78 days.

(21) Appl. No.: 15/222,647

(22) Filed: Jul. 28, 2016

(65) Prior Publication Data
US 2018/0035446 A1   Feb. 1, 2018

(51) Int. Cl.
| | |
|---|---|
| *H04W 72/12* | (2009.01) |
| *H04L 5/14* | (2006.01) |
| *H04L 5/00* | (2006.01) |
| *H04J 11/00* | (2006.01) |
| *H04W 28/02* | (2009.01) |

(52) U.S. Cl.
CPC ......... *H04W 72/1236* (2013.01); *H04L 5/003* (2013.01); *H04L 5/14* (2013.01); *H04W 72/1273* (2013.01); *H04J 11/0023* (2013.01); *H04L 5/0064* (2013.01); *H04L 5/0073* (2013.01); *H04W 28/0236* (2013.01); *H04W 72/1252* (2013.01)

(58) Field of Classification Search
None
See application file for complete search history.

(56) References Cited

U.S. PATENT DOCUMENTS

| | | | |
|---|---|---|---|
| 8,036,145 B2 | 10/2011 | Power et al. | |
| 8,391,251 B2 | 3/2013 | Sun et al. | |
| 8,780,790 B2 | 7/2014 | Sarkar | |
| 9,848,339 B2* | 12/2017 | Huang | H04W 28/20 |
| 2004/0160925 A1* | 8/2004 | Heo | H04L 1/1845 370/335 |

(Continued)

OTHER PUBLICATIONS

ETRI: "Frame Structure for New Radio Interface", 3GPP TSG RAN WG1 Meeting #85, R1-164871, May 14, 2016, XP051096290, Retrieved from the Internet: URL:http://www.3gpp.org/ftp/tsg_ran/WG1_RL1/TSGR1_85/Docs/, 3 pages.

(Continued)

*Primary Examiner* — George C Atkins
(74) *Attorney, Agent, or Firm* — Norton Rose Fulbright LLP

(57) ABSTRACT

Techniques for transmission of Ultra-Reliable Low-Latency Communications (URLLC) data over Time Division Duplex (TDD) using a URLLC configuration for a TDD subframe are disclosed. The techniques include determining that data scheduled for transmission using a TDD band over a TDD subframe includes Ultra-Reliable Low-Latency Communications (URLLC) data, and in response, utilizing a URLLC subframe configuration for the TDD subframe. The URLLC subframe configuration includes downlink intervals and uplink intervals.

22 Claims, 11 Drawing Sheets

(56) References Cited

U.S. PATENT DOCUMENTS

| | | | |
|---|---|---|---|
| 2009/0296833 A1* | 12/2009 | Sawahashi | H04L 1/0007 375/260 |
| 2012/0281611 A1 | 11/2012 | Zhang et al. | |
| 2014/0086078 A1* | 3/2014 | Malladi | H04W 72/042 370/252 |
| 2015/0003304 A1* | 1/2015 | Wu | H04L 1/1854 370/280 |
| 2015/0043434 A1 | 2/2015 | Yamada et al. | |
| 2015/0304096 A1 | 10/2015 | Sahlin et al. | |
| 2016/0128095 A1* | 5/2016 | Damnjanovic | H04W 72/14 370/336 |
| 2016/0352551 A1* | 12/2016 | Zhang | H04L 27/2602 |
| 2017/0111106 A1* | 4/2017 | Lee | H04B 7/2615 |
| 2017/0215179 A1* | 7/2017 | Choi | H04W 72/0413 |
| 2017/0290013 A1* | 10/2017 | McCoy | H04L 5/005 |
| 2017/0332386 A1* | 11/2017 | Li | H04L 1/1812 |
| 2017/0332396 A1* | 11/2017 | Liao | H04L 27/2607 |
| 2017/0339711 A1* | 11/2017 | Belghoul | H04L 45/306 |
| 2017/0366311 A1* | 12/2017 | Iyer | H04B 7/0482 |
| 2018/0019843 A1* | 1/2018 | Papasakellariou | H04L 1/1822 |
| 2018/0205534 A1* | 7/2018 | Yi | H04L 5/1469 |
| 2018/0242304 A1* | 8/2018 | Rong | H04W 28/0247 |
| 2019/0075617 A1* | 3/2019 | Tomeba | H04W 16/26 |

OTHER PUBLICATIONS

International Search Report and Written Opinion—PCT/US2017/036084—ISA/EPO—dated Sep. 13, 2017 (160797WO).
Nokia et al., "Basic Frame Structure Principles for 5G", 3GPP TSG-RAN WG1#85, R1-165027, May 13, 2016, XP051090126, Retrieved from the Internet: URL:http://www.3gpp.org/ftp/tsg_ran/WG1_RL1/TSGR1_85/Docs/, 6 pages.
Partial International Search Report—PCT/US2017/036084—ISA/EPO—dated Aug. 9, 2017 (160797WO).
Zte et al., "Frame Structure Design for NR", 3GPP TSG RAN WG1 Meeting #85, R1-164274, May 14, 2016, XP051090018, Retrieved from the Internet: URL:http://www.3gpp.org/ftp/tsg_ran/WG1_RL1/TSGR1_85/Docs/, 11 pages.

* cited by examiner

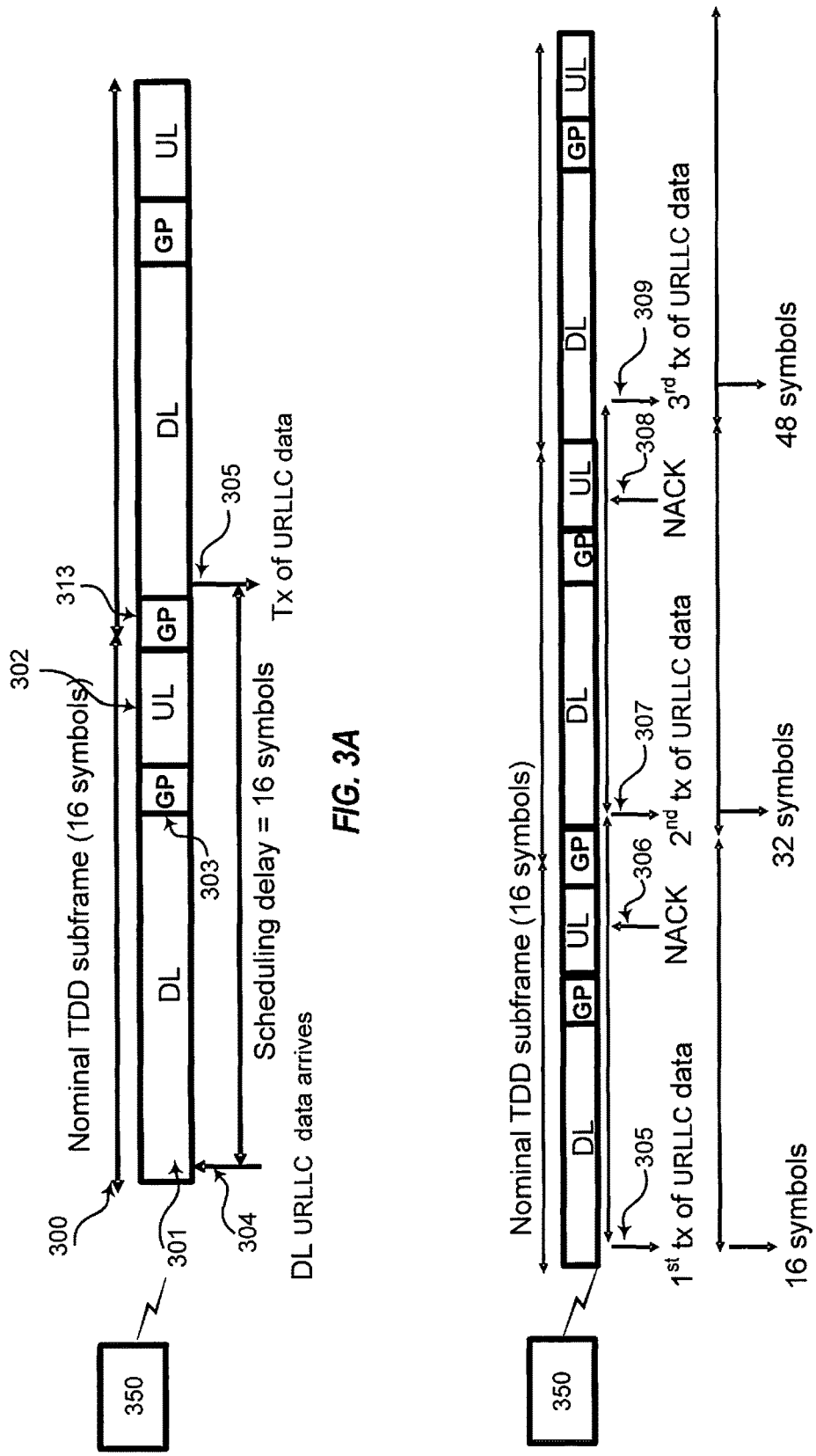

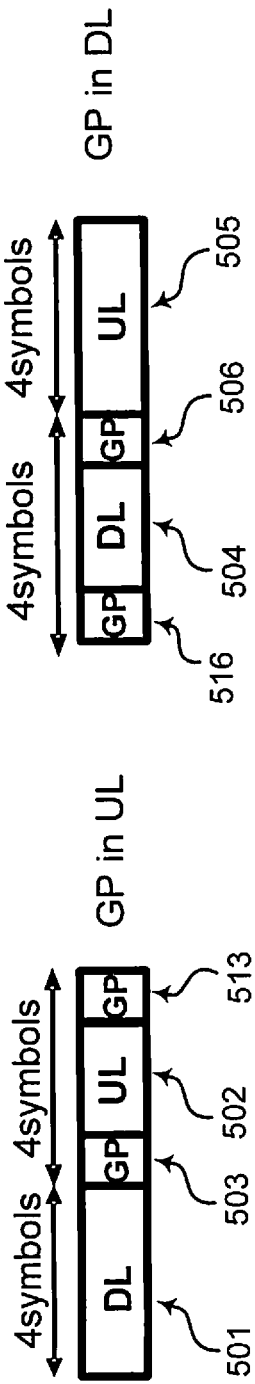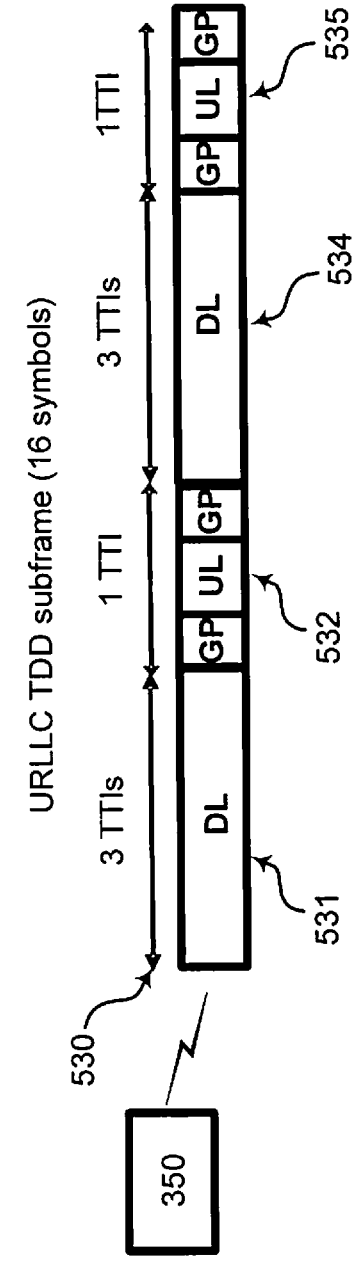
FIG. 5A  FIG. 5B  FIG. 5C

TRANSMISSION OF ULTRA-RELIABLE LOW-LATENCY COMMUNICATIONS (URLLC) OVER TIME DIVISION DUPLEX (TDD) USING A URLLC CONFIGURATION FOR A TDD SUBFRAME

BACKGROUND

Field

Aspects of the present disclosure relate generally to wireless communication systems, and more particularly, to the transmission of Ultra-Reliable Low-Latency Communications (URLLC) data over time division duplex (TDD) using a URLLC configuration for a TDD subframe.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes determining that data scheduled for transmission using a TDD band over a TDD subframe includes URLLC data; and utilizing, in response to the determining, a URLLC subframe configuration for the TDD subframe, wherein the URLLC subframe configuration includes a plurality of downlink intervals and a plurality of uplink intervals.

In another aspect, a computer program product comprises a non-transitory computer-readable medium having instructions recorded thereon that, when executed by one or more computer processors, cause the one or more computer processors to carry out operations. For example, the operations include determining that data scheduled for transmission using a TDD band over a TDD subframe includes URLLC data and in response, utilizing a URLLC subframe configuration for the TDD subframe, wherein the URLLC subframe configuration includes a plurality of downlink intervals and a plurality of uplink intervals.

In yet another aspect, an apparatus includes means for determining that data scheduled for transmission using a TDD band over a TDD subframe includes URLLC data, and means for utilizing, in response to the determining, a URLLC subframe configuration for the TDD subframe, wherein the URLLC subframe configuration includes a plurality of downlink intervals and a plurality of uplink intervals.

In another aspect, a transmitter apparatus includes computer readable memory configured to determine that data scheduled for transmission using a TDD band over a TDD subframe includes URLLC data, and utilize, in response to the determining, a URLLC subframe configuration for the TDD subframe, wherein the URLLC subframe configuration includes a plurality of downlink intervals and a plurality of uplink intervals.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 3A and 3B are block diagrams illustrating a transmission stream of a network entity configured for a nominal TDD subframe configuration.

FIGS. 5A and 5B are diagrams illustrating intervals of a URLLC TDD subframe configuration in accordance with aspects of the present disclosure.

FIG. 5C is a diagram illustrating a network entity configured for a URLLC TDD subframe configuration in accordance with aspects of the present disclosure.

DETAILED DESCRIPTION

Figure 1:
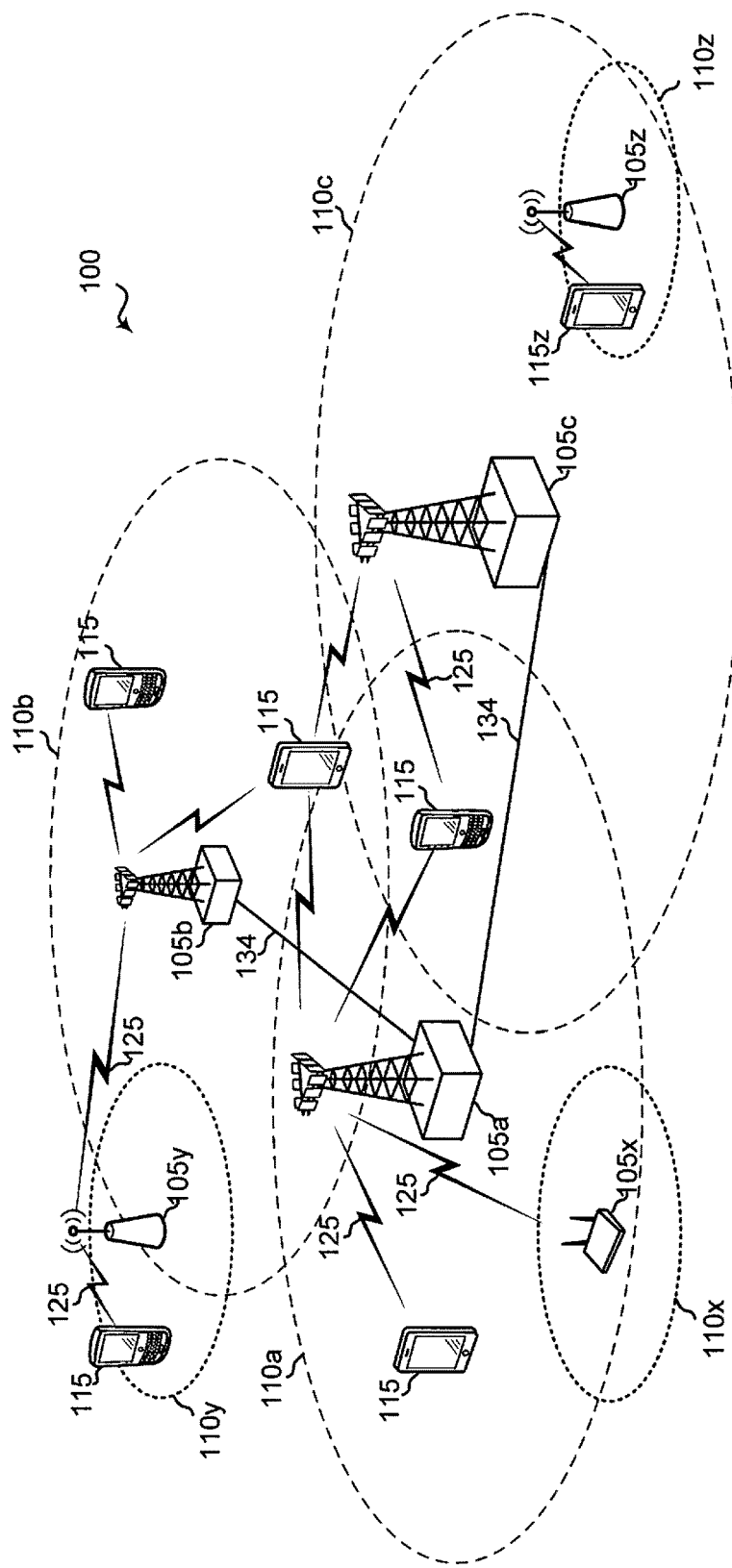
FIG. 1 is a block diagram illustrating details of a wireless communication system.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various examples, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. For clarity, certain aspects of the apparatus and techniques may be described below for LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

A new carrier type based on LTE/LTE-A including unlicensed spectrum has also been suggested that can be compatible with carrier-grade WiFi, making LTE/LTE-A with unlicensed spectrum an alternative to WiFi. LTE/LTE-A, when operating in unlicensed spectrum, may leverage LTE concepts and may introduce some modifications to physical layer (PHY) and media access control (MAC) aspects of the network or network devices to provide efficient operation in the unlicensed spectrum and meet regulatory requirements. The unlicensed spectrum used may range from as low as several hundred Megahertz (MHz) to as high as tens of Gigahertz (GHz), for example. In operation, such LTE/LTE-A networks may operate with any combination of licensed or unlicensed spectrum depending on loading and availability. Accordingly, it may be apparent to one of skill in the art that the systems, apparatus and methods described herein may be applied to other communications systems and applications.

System designs may support various time-frequency reference signals for the downlink and uplink to facilitate beamforming and other functions. A reference signal is a signal generated based on known data and may also be referred to as a pilot, preamble, training signal, sounding signal, and the like. A reference signal may be used by a receiver for various purposes such as channel estimation, coherent demodulation, channel quality measurement, signal strength measurement, and the like. MIMO systems using multiple antennas generally provide for coordination of sending of reference signals between antennas; however, LTE systems do not in general provide for coordination of sending of reference signals from multiple base stations or eNBs.

In some implementations, a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. Reciprocity may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In LTE implementations, orthogonal frequency division multiplexing (OFDM) is used for the downlink—that is, from a base station, access point or eNodeB (eNB) to a user terminal or UE. Use of OFDM meets the LTE requirement for spectrum flexibility and enables cost-efficient solutions for very wide carriers with high peak rates, and is a well-established technology. For example, OFDM is used in standards such as IEEE 802.11a/g, 802.16, High Performance Radio LAN-2 (HIPERLAN-2, wherein LAN stands for Local Area Network) standardized by the European Telecommunications Standards Institute (ETSI), Digital Video Broadcasting (DVB) published by the Joint Technical Committee of ETSI, and other standards.

Time frequency physical resource blocks (also denoted here in as resource blocks or "RBs" for brevity) may be defined in OFDM systems as groups of transport carriers (e.g. sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot. Additional details of LTE RBs and REs are described in the 3GPP specifications, such as, for example, 3GPP TS 36.211.

UMTS LTE supports scalable carrier bandwidths from 20 MHz down to 1.4 MHZ. In LTE, an RB is defined as 12 sub-carriers when the subcarrier bandwidth is 15 kHz, or 24 sub-carriers when the sub-carrier bandwidth is 7.5 kHz. In an exemplary implementation, in the time domain there is a defined radio frame that is 10 ms long and consists of 10 subframes of 1 millisecond (ms) each. Every subframe consists of 2 slots, where each slot is 0.5 ms. In some implementations, a subframe may have a duration less than 1 ms. For example, a subframe may have a duration of 0.5 ms. The subcarrier spacing in the frequency domain in this case is 15 kHz. Twelve of these subcarriers together (per slot) constitute an RB, so in this implementation one resource block is 180 kHz. Six Resource blocks fit in a carrier of 1.4 MHz and 100 resource blocks fit in a carrier of 20 MHz.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 shows a wireless network 100 for communication, which may be an LTE-A network. The wireless network 100 includes a number of evolved node Bs (eNBs) 105 and other network entities. An eNB may be a station that communicates with the UEs and may also be referred to as a base station, a node B, an access point, and the like. Each eNB 105 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. In the example shown in FIG. 1, the eNBs 105a, 105b and 105c are macro eNBs for the macro cells 110a, 110b and 110c, respectively. The eNBs 105x, 105y, and 105z are small cell eNBs, which may include pico or femto eNBs that provide service to small cells 110x, 110y, and 110z, respectively. An eNB may support one or multiple (e.g., two, three, four, and the like) cells.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, an appliance, an automobile, any other Internet-of-things (IoT) device, or the like. A UE may be able to communicate with macro eNBs, pico eNBs, femto eNBs, relays, and the like. In FIG. 1, a lightning bolt (e.g., communication links 125) indicates wireless transmissions between a UE and a serving eNB, which is an eNB designated to serve the UE on the downlink and/or uplink, or desired transmission between eNBs. Wired backhaul communication 134 indicates wired backhaul communications that may occur between eNBs.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

Figure 2:
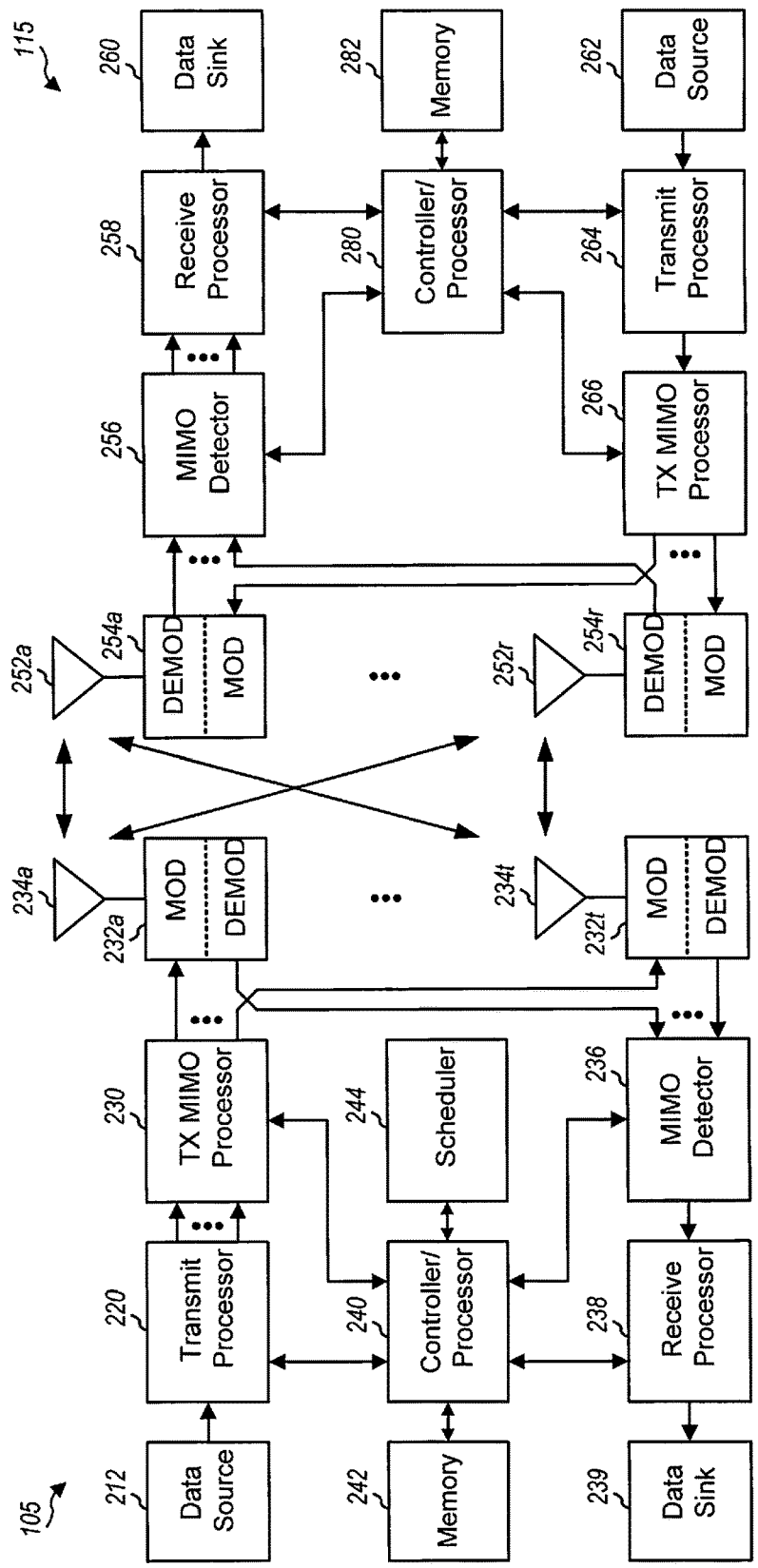
FIG. 2 is a block diagram conceptually illustrating a design of a base station/eNB and a UE configured according to one aspect of the present disclosure.

FIG. 2 shows a block diagram of a design of a base station/eNB 105 and a UE 115, which may be one of the base stations/eNBs and one of the UEs in FIG. 1. For a restricted association scenario, the eNB 105 may be the small cell eNB 105z in FIG. 1, and the UE 115 may be the UE 115z, which in order to access small cell eNB 105z, would be included in a list of accessible UEs for small cell eNB 105z. The eNB 105 may also be a base station of some other type. The eNB 105 may be equipped with antennas 234a through 234t, and the UE 115 may be equipped with antennas 252a through 252r.

At the eNB 105, a transmit processor 220 may receive data from a data source 212 and control information from a controller/processor 240. The control information may be for the PBCH, PCFICH, PHICH, PDCCH, etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the eNB 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the eNB 105. At the eNB 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the eNB 105 and the UE 115, respectively. The controller/processor 240 and/or other processors and modules at the eNB 105 may perform or direct the execution of various processes for the techniques described herein. The controllers/processor 280 and/or other processors and modules at the UE 115 may also perform or direct the execution of the functional blocks illustrated in FIG. 10, and/or other processes for the techniques described herein. The memories 242 and 282 may store data and program codes for the eNB 105 and the UE 115, respectively. A scheduler 244 may schedule UEs for data transmission on the downlink and/or uplink.

In some aspects, the present disclosure is directed to supporting URLLC services over TDD. URLLC services may include transmission and reception of URLLC data. Such transmissions and receptions may often have low latency and high reliability requirements. Unfortunately, the nominal structure of an enhanced mobile broadband (eMBB) TDD subframe has several fundamental limitations that restrict the reliability and latency achievements that can be obtained. For example, although a nominal TDD subframe may be self-contained, in that it may contain a downlink (DL) interval and an uplink (UL) interval, in the nominal TDD subframe structure only one direction in downlink or uplink may be active at any time. This feature creates a self-blocking characteristic in the nominal TDD subframe structure. Thus, during uplink intervals, no downlink transmissions are possible. Similarly, during downlink intervals, no uplink transmissions are possible.

A deadline constraint for the transmission of URLLC data may exist. For example, a delay budget consisting of a particular period of time or number of symbols may be provided. Given the deadline constraint, URLLC data must be successfully delivered within the delay budget. Because of the self-blocking limitation of the nominal TDD subframe structure, a large nominal TDD subframe structure limits the number of possible URLLC data transmissions within the given delay budget and thus, the highest system reliability that may be achieved. The present disclosure provides a solution to these, and other problems, by providing a URLLC TDD subframe configuration that takes into account the limitations of the nominal TDD subframe. Accordingly, in some aspects, a network entity operating in accordance with the concepts herein may determine the presence of URLLC traffic and, based on such determination, utilize a URLLC TDD subframe configuration having a DL/UL/DL/UL pattern (DUDU). Thus, the URLLC DUDU configuration provides a plurality of downlink intervals and a plurality of uplink intervals within the same TDD subframe, resulting in decreased system latency, as explained in greater detail below. The DUDU subframe configuration may also enable retransmissions (e.g., hybrid automatic retransmission (HARQ) retransmissions) within a TDD subframe. With enabled retransmissions within a TDD subframe, more retransmissions may be allowed given a delay budget which provides greater system reliability. Additionally, to provide a balance between latency and efficiency, a scalable transmission time interval (TTI) is provided with the URLLC DUDU subframe configuration.

In some aspects, the network entity may be previously configured to utilize either a nominal TDD subframe structure, or a URLLC TDD subframe configuration. In other aspects, the network entity may be configured to transition from a nominal TDD subframe configuration to the URLLC TDD subframe configuration when the presence of URLLC traffic is detected. Similarly, the network entity may be configured to transition from the URLLC TDD subframe configuration to the nominal TDD subframe configuration when no URLLC traffic is detected.

In aspects of the present disclosure, a network entity may refer to a wireless apparatus such as a base station/eNB, a UE, a transceiver, or a network entity transmitting wireless signals. Thus, although the discussion of the concepts herein is mostly with respect to a base station, the concepts may also be applicable to operations of a UE, or any network entity supporting URLLC services over TDD. In particular, where the examples herein illustrate a network entity transmitting on a downlink and receiving on an uplink (e.g., a base station), it is envisioned that the concepts illustrated would also be applicable to a network entity that transmits on an uplink and receives on a downlink (e.g., a UE).

FIG. 3A shows exemplary network entity 350 configured to use a self-contained eMBB nominal TDD subframe structure 300. The nominal TDD subframe structure 300 may have a duration of 16 symbols. Nominal TDD subframe structure 300 may include a single downlink interval 301, a single uplink interval 302, and guard periods (GPs) 303 and 313. Downlink interval 301 may be used to transmit data and control information to a wireless device. These transmissions to the wireless device may be performed using downlink physical channels that may include at least one, or a combination, of a physical downlink control channel (PDCCH), a physical HARQ indicator channel (PHICH), and a physical downlink shared channel (PDSCH). Uplink interval 302, may be used by a base station to receive data and control information from the wireless device. These transmissions from the wireless device may be received via uplink physical channels that may include at least one of a physical uplink control channel (PUCCH) and a physical uplink shared channel (PUSCH). GP 303 may be included in nominal TDD subframe 300 between downlink interval 301 and uplink interval 302 to facilitate the switching from downlink to uplink. GP 313 may be included in nominal TDD subframe 300 to facilitate the switching from uplink to downlink.

During exemplary operations of network entity 350 with a TDD subframe having a nominal TDD configuration, URLLC data may arrive at network entity 350 at time 304 to be transmitted to a wireless device. As network entity 350 is already in the downlink interval, the URLLC data cannot be scheduled for transmission to the wireless device until the next downlink interval, at time 305. However, time 305 is during the next subframe. Therefore, there would be a scheduling delay of 16 symbols between the arrival of the URLLC data to network entity 350 for transmission to the wireless device and the transmission of the URLLC data to the wireless device. Such a large scheduling delay for URLLC data impacts system reliability because it limits the number of retransmissions that can be performed given a delay budget.

With reference to FIG. 3B, a first transmission of URLLC data from network entity 350 to the wireless device may be performed at time 305. At time 306, a HARQ NACK may be received from the wireless device. Network entity 350 may perform a second HARQ transmission of the URLLC data to the wireless device at time 307. As illustrated, in the example of FIG. 3B, the second HARQ transmission would take place approximately 16 symbols after the first transmission of the URLLC data (at time 305) and, assuming a 16-symbol scheduling delay for the URLLC data, the second HARQ transmission will take place approximately 32 symbols after arrival of the URLLC data for transmission to network entity 350. At time 308, a second HARQ NACK may be received from the wireless device. Network entity 350 may perform a third HARQ transmission of the URLLC data to the wireless device at time 309. In this example, the third HARQ transmission at time 309 will take place approximately 32 symbols after the first transmission of the URLLC data (at time 35) and, assuming a 16-symbol scheduling delay for the URLLC data, the third HARQ transmission will take place approximately 48 symbols after arrival of the URLLC data to the eNB. Assuming, for example, a delay budget of 48 symbols, the third HARQ transmission will go over the delay budget. Therefore, in this example, with a delay budget of 48 symbols, only two HARQ transmissions would be possible. Those of skill in the art would recognize that a greater amount of HARQ transmissions result in better system reliability. Thus, with a limited amount of HARQ transmissions allowed with the nominal TDD configuration of FIG. 3A and FIG. 3B, system reliability is negatively impacted.

Figure 4A:
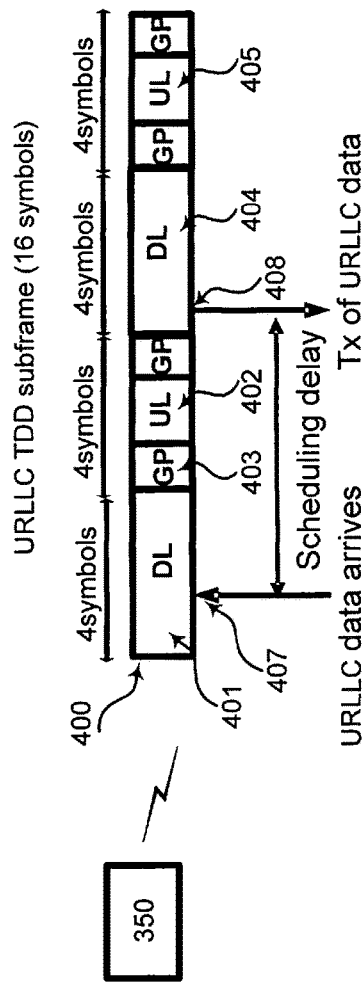
FIGS. 4A and 4B are block diagrams illustrating a transmission stream of a network entity configured for a URLLC TDD subframe configuration in accordance with aspects of the present disclosure.

FIG. 4A shows a network entity 350 configured for a TDD subframe in accordance with aspects of the present disclosure. URLLC TDD subframe 400 may have a duration of 16 symbols. However, unlike the nominal TDD subframe, URLLC TDD subframe 400 may include multiple downlink intervals 401 and 404, and multiple uplink intervals 402 and 405. In aspects of the present disclosure, the URLLC TDD subframe configuration may comprise a DUDU pattern. In the DUDU pattern illustrated in FIG. 4A, URLLC TDD subframe 400 may begin with downlink interval 401. Downlink interval 401 may be used to transmit data and control information from a base station to a UE. Downlink interval

401 may be followed by uplink interval 402. Uplink interval 402 may be used to transmit data and control information to the base station from the UE. Uplink interval 402 may be followed by downlink interval 404, and downlink interval 404 may be followed by uplink interval 405. Thus, in accordance with aspects of the present disclosure, the URLLC TDD subframe configuration may comprise a DUDU pattern.

In aspects of the disclosure, the DUDU pattern of the URLLC TDD subframe configuration is fixed and does not change. In other aspects, the DUDU pattern may be adjusted depending on latency, traffic load, or reliability requirements. Thus, in some aspects, the URLLC TDD subframe configuration may be adjusted to include different numbers of downlink and uplink intervals. For example, the URLLC TDD subframe configuration may be adjusted to a DUDUDU pattern. Such patterns may be selected, or generated, based on the latency, traffic load, or reliability requirements of the system. The different configuration patterns may be predetermined and stored in the memory of the network entity.

Furthermore, the duration of the downlink and uplink intervals of the URLLC TDD subframe configuration pattern may also be adjusted based on system requirements. For example, with reference to FIG. 5C, URLLC TDD subframe 530 may include downlink intervals 531 and 534, and uplink intervals 532 and 535. Downlink intervals 531 and 534 may have a different duration than uplink intervals 532 and 535. For example, downlink intervals 531 and 534 may have a duration of three TTIs each, and uplink intervals 532 and 535 may have a duration of one TTI each. TTIs can be of varying symbol sized. This asymmetric pattern of the URLLC TDD subframe is discussed in more detail below. In other aspects, each interval may have a different duration than every other interval. For example, downlink intervals 531 may have a different duration than downlink interval 534.

A GP may be included between the downlink intervals and the uplink intervals to facilitate the switching from uplink to downlink, and the switching from downlink to uplink. For example, referring back to FIG. 4A, a GP 403 is included between downlink 401 and uplink interval 402 to facilitate the switching from downlink to uplink. Similarly, a GP is included between uplink interval 402 and downlink interval 404 to facilitate the switching from uplink to downlink. In some aspects, the GP may be included as part of the downlink interval, and in other aspects, the GP may be included as part of the uplink interval. For example, FIG. 5A illustrates two intervals of a URLLC TDD subframe that include a GP between the switching. In this example, downlink interval 501 has a duration of four symbols. Uplink interval 502 also has a duration of four symbols, but one symbol is used for GP 503, and one symbol is used for GP 513, leaving two symbols for uplink communications. FIG. 5B illustrates a case where the GP is included in the downlink interval. In this example, downlink interval 504 has a duration of four symbols, but one symbol is used for GP 506, and one symbol is used for GP 516, leaving two symbols for downlink communications. Uplink interval 505 has four symbols, and all four symbols are used for uplink communications. It is noted that these values are used for illustration purposes and other values for the downlink/uplink intervals and GP may be used.

Referring back to FIG. 4A, during exemplary operations in accordance with the present disclosure, network entity 350, such as a base station or a UE, may determine that URLLC data is to be transmitted during TDD subframe 400.

In response to this determination, network entity 350 may utilize a URLLC TDD subframe configuration. Utilizing the URLLC TDD subframe configuration, the URLLC data, which arrives at network entity 350 at time 407, may be scheduled to be transmitted during the next downlink interval, at time 408, which is within the same subframe, but approximately 8 symbols later than time 407. Thus, the scheduling delay in this example would be approximately 8 symbols, which is significantly less than 16 symbols. In contrast, the scheduling delay, if the nominal TDD subframe configuration were used in this example as discussed above with respect to FIG. 3A, would be approximately 16 symbols. Accordingly, by implementing the concepts of the present disclosure, latency may be greatly improved. It should be understood that the above example is for illustrative purposes and other results may be obtained with different interval durations. For example, a different interval duration may be used, greater or lower than 4 symbols, which would result in a different scheduling delay.

It is again noted that although the discussion of the concepts herein is mostly with respect to URLLC data to be transmitted by a network entity on a downlink interval, the concepts discussed herein would also be applicable to a network entity with URLLC data to be transmitted on an uplink interval. For example, network entity 350 may be a UE. In this case, the URLLC data would be transmitted on an uplink interval and the concepts discussed herein would still apply.

Figure 4B:
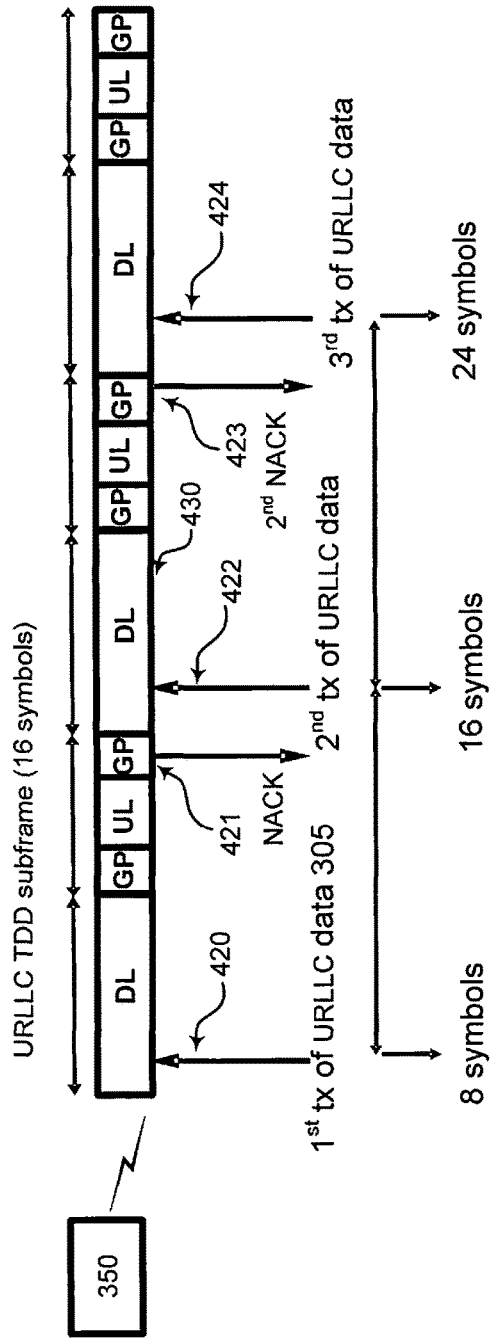

By decreasing the scheduling delay of URLLC data, the number of retransmissions that can be performed given a delay budget may also be increased, thereby increasing system reliability. For example, with reference to FIG. 4B, a first transmission of URLLC data from network entity 350 may be performed at time 420. At time 421, a HARQ NACK may be received by network entity 350 in response to the first transmission. Network entity 350 may perform a second HARQ transmission of the URLLC data at time 422. As illustrated in the example, the second HARQ transmission during downlink interval 430 will take place approximately 8 symbols after the first transmission of the URLLC data (at time 420) and, assuming a scheduling delay of approximately 8 symbols for the URLLC data, the second HARQ transmission will take place approximately 16 symbols after arrival of the URLLC data to network entity 350. Assuming a TTI of 4 symbols, the over the air (OTA) delay of the second HARQ transmission would be 20 symbols (see Table 1, discussed in more detail below). As discussed further below, the 20 symbol OTA delay for the second HARQ transmission includes the 8 symbol scheduling delay, the 8 symbol transmission of the first HARQ transmission, and the 4 symbol TTI for the second HARQ transmission. At time 423, a second HARQ NACK may be received by network entity 350 in response to the second HARQ transmission. Network entity 350 may perform a third HARQ transmission of the URLLC data at time 424. In this example, the third HARQ transmission at time 424 will take place approximately 16 symbols after the first transmission of the URLLC data (at time 420) and, assuming a scheduling delay of approximately 8 symbols for the URLLC data, the third HARQ transmission will take place approximately 24 symbols after arrival of the URLLC data to network entity 350. The OTA delay of the third HARQ transmission would be 28 symbols. Further assuming, for example, a delay budget of 48 symbols, the third HARQ transmission will be well within the delay budget.

Following the above example, a total of five HARQ transmissions may be performed within the 48 symbol delay budget. In contrast, as discussed above, using the nominal TDD subframe configuration would allow only two HARQ transmissions within a 48 symbol delay budget. Those of skill in the art would recognize that the greater amount of transmissions allowed by the URLLC TDD subframe configuration of the present disclosure results in a higher system reliability. The above examples are presented for illustrative purposes and should not be taken to limit this disclosure to only the values and results of the examples. It should be understood that the present disclosure contemplates that other values and results may be obtained.

As discussed above, the duration of the downlink and uplink intervals of the URLLC TDD subframe configuration pattern may also be adjusted based on system requirements. In selected aspects, the downlink or uplink intervals of the URLLC TDD subframe may have a baseline duration. The baseline can be used to determine performance gains (e.g., latency reduction, higher reliability) that can be obtained by adjusting the durations of the downlink and uplink intervals of the URLLC TDD subframe configuration. For example, referring back to FIG. 4A, URLLC TDD subframe 400 may have a duration of 16 symbols. Each of downlink intervals 401 and 404 may have a duration of 4 symbols. Similarly, each of uplink intervals 402 and 405 may have a duration of 4 symbols. As noted above, a GP (e.g., GPs 403 and 406) may be included as part of the intervals to facilitate switching between downlink and uplink. The duration of the downlink and uplink intervals may be adjusted by implementing a scalable TTI for the URLLC TDD subframe configuration.

Figure 6:
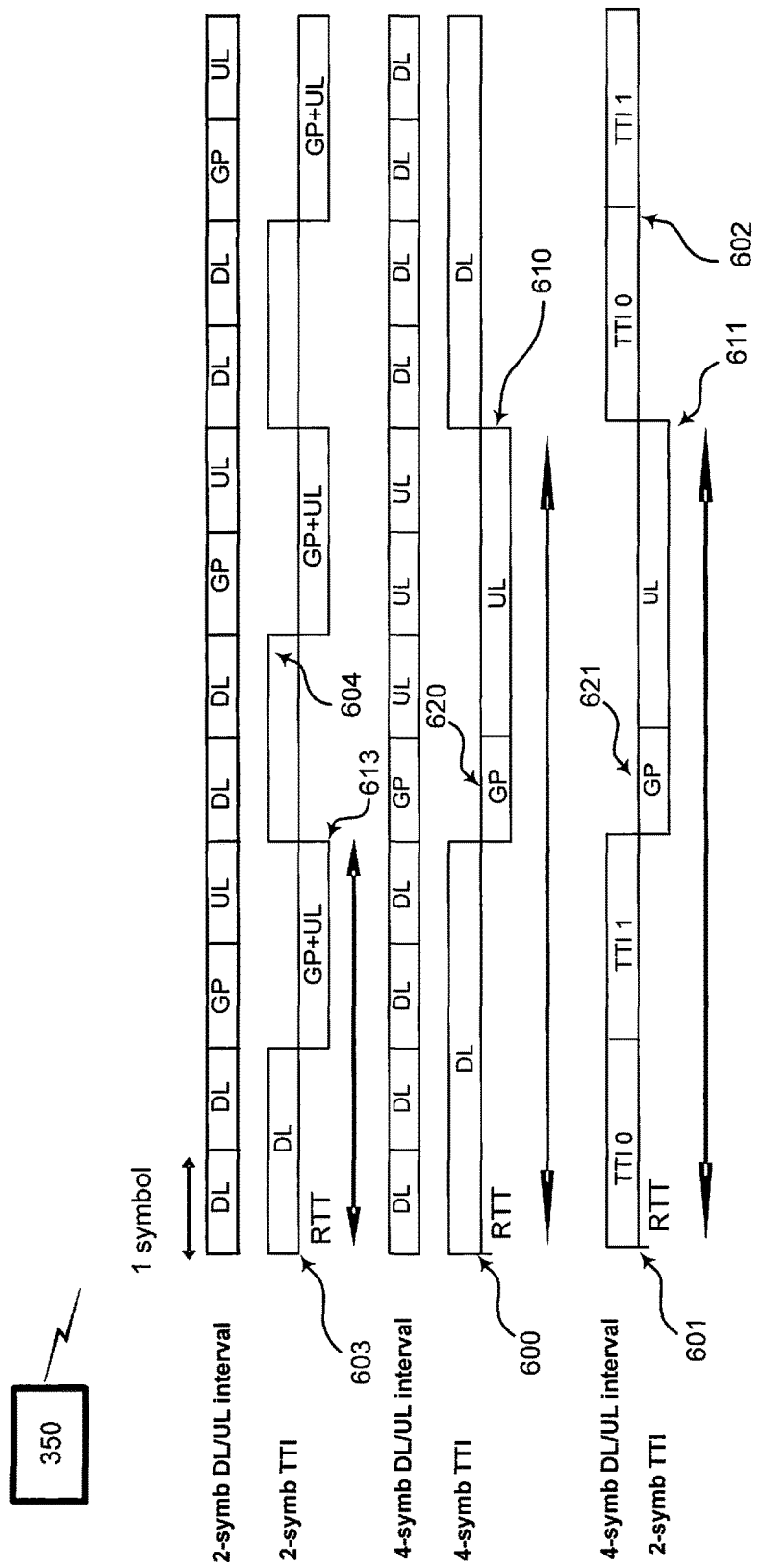
FIG. 6 is a diagram conceptually illustrating a network entity configured for adaptable durations for intervals of a URLLC TDD subframe configuration in accordance with aspects of the present disclosure.

In the nominal TDD subframe configuration, the duration of the TTI may be fixed to be equal to the duration of the downlink and uplink intervals. That is, in the nominal TDD subframe configuration, the downlink and uplink intervals are set to equal a single TTI. Aspects of the present disclosure provide a scalable TTI that may have a shorter duration than the downlink/uplink intervals of the URLLC TDD subframe for further latency reduction. Table 1, and FIG. 6, show different configurations of a TTI for a URLLC TDD subframe. The TTI provided may have a duration of 1, 2, or 4 symbols. It should be understood that the values for these symbol durations are for illustrative purposes only and other symbol durations may be used (e.g., 8, 16, or 32 symbols).

TABLE 1

| DL/UL interval (symbols) | TTI duration (symbols) | Switching Overhead | Scheduling Delay (symbols) | HARQ RTT (symbols) | OTA delay for two HARQ transmissions |
|---|---|---|---|---|---|
| 1 | 1 | 33% | 3 | 3 | 7 symbols |
| 2 | 2 | 25% | 4 | 4 | 10 symbols |
| 4 | 4 | 12.5% | 8 | 8 | 20 symbols |
| 4 | 2 | 12.5% | 6 | 8 | 16 symbols |

In some aspects of the present disclosure, the downlink and uplink durations are the same as the duration of the TTI. For example, downlink interval 600 may have a 4-symbol duration, and uplink interval 610 (including GP 620) may also have a 4-symbol duration. In this example, the TTI also has a duration of 4 symbols. As illustrated in Table 1, and with reference to the example discussed above illustrated in FIG. 4B, the OTA delay of the second transmission at 422, comprising two HARQ transmissions and a scheduling delay, would be 20 symbols. The 20 symbols would include an 8-symbol scheduling delay, an 8-symbol round-trip time (RTT) between the first and second HARQ transmissions, and a 4-symbol TTI for the second transmission.

In various aspects of the present disclosure, the duration of the downlink and uplink intervals may be adjusted to reduce system latency. For example, downlink interval 603 may have a 2-symbol duration, and uplink interval 613 may also have a 2-symbol duration. In this example, the TTI may also have a duration of 2 symbols. In this case, the scheduling delay would be reduced to 4 symbols, as network entity 350 would be able to transmit, during downlink interval 604, which is only 4 symbols ahead, URLLC data arriving at downlink interval 603. A HARQ NACK may be received during the next uplink interval, which would be 4 symbols after the first HARQ transmission. In response to the HARQ NACK, network entity 350 would schedule a second HARQ transmission, which would have a TTI of 2 symbols. In total, as shown in Table 1, the OTA delay of the second transmission in this example would be 10 symbols. The symbols would include a 4-symbol scheduling delay, a 4-symbol RTT between the first and second HARQ transmissions, and a 2-symbol TTI for the second transmission. Thus, implementing an adjustable downlink/uplink interval duration in accordance with the concepts of the present disclosure provides further latency reduction for a URLLC TDD subframe configuration.

As further illustrated in Table 1, different OTAs may be obtained for the different DL/UL interval durations. However, shorter DL/UL interval durations result in higher switching overhead. As noted above, a GP is provided between a downlink and uplink interval to facilitate the switching. During the GP, no transmission is performed. Thus, this switching overhead is essentially lost. In the above case, for a DL/UL interval duration of 2 symbols, and a TTI of 2-symbols, the overhead is 25%. This is due to the fact that one symbol is used to switch between the downlink and uplink. Thus, out of a total of 4 symbols allocated to the uplink and downlink intervals, 1 symbol may not be used for transmission/reception. It is noted that in some aspects, the GP interval can be less than one symbol. To further mitigate this problem of lost overhead, a scalable TTI may be provided by the present disclosure.

In aspects of the present disclosure, the TTI duration may be configured to be less than the duration of the downlink or uplink intervals to provide further latency reduction. For example, with reference to FIG. 6, downlink interval 601 may have a 4-symbol duration, and uplink interval 611 (including GP 621) may also have a 4-symbol duration. In this example, however, the TTI may have a duration of 2 symbols. Thus, downlink interval 601 would include TTI0 and TTI1, each TTI having a 2-symbol duration. In this example, the scheduling delay is reduced. URLLC data arriving at network entity 350 during TTI0 to be transmitted may be transmitted during TTI1 of downlink interval 601. In this case, the scheduling delay would be only 2 symbols. Alternatively, URLLC data arriving at network entity 350 during TTI1 to be transmitted may be transmitted during TTI0 of downlink interval 602. In this case, the scheduling delay is 6 symbols. Taking the latter case, a HARQ NACK may be received during the next uplink interval, which would be 8 symbols after the first HARQ transmission. In response to the HARQ NACK, network entity 350 would schedule a second HARQ transmission, which would have a TTI of 2 symbols. In total, as shown in Table 1, the OTA delay of the second transmission in this example would be 16 symbols. The 16 symbols would include a 6-symbol scheduling delay, an 8-symbol RTT between the first and second HARQ transmissions, and a 2-symbol TTI for the second HARQ transmission. Thus, implementing the concepts of the present disclosure provides further latency reduction for a URLLC TDD subframe configuration.

As can be appreciated from Table 1, a URLLC TDD subframe configuration having DL/UL intervals of 4 symbols each, and with a TTI duration of 4 symbols has an OTA delay of 20 symbols, and a switching overhead of 12.5%. The OTA delay may be reduced to 10 symbols by decreasing the DL/UL intervals, and the TTI, to 2 symbols, but this would result in an increased switching overhead of 25%. The OTA delay may be further reduced to 7 symbols by reducing the DL/UL intervals, and the TTI duration to 1 symbol, but this would result in an increased switching overhead of 33%. However, by scaling the TTI to provide a URLLC TDD subframe configuration with a TTI duration that is shorter than the DL/UL intervals, a balance between the decreased latency and the increased overhead may be achieved. For example, a URLLC TDD subframe configuration having DL/UL intervals of 4 symbols each, and with a TTI duration of 2 symbols would have a decreased OTA delay of 16 symbols, but the switching overhead would remain at 12.5%. Thus, the scalable TTI of the present disclosure provides further latency reductions while enabling different efficiency to latency tradeoffs, thereby providing greater flexibility for communication systems. It should be appreciated that in some aspects, the TTI duration is adjusted, as discussed above, based on a desired latency for the transmission of the URLLC data.

In some aspects of the present disclosure, the URLLC TDD subframe is configured to align control channels of the URLLC TDD subframe with the control channels of nominal TDD subframes of neighbor cells in order to facilitate interference management. As discussed above, a network entity, such as a base station, may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE to the base station may encounter interference from uplink transmissions of other UEs communicating with the neighbor base station or from other wireless RF transmitters. Similarly, a transmission from a UE to the neighbor base station may encounter interference due to uplink transmissions to the network entity.

In some cases, downlink-to-uplink or uplink-to-downlink interference scenarios (collectively and separately referred to herein as mixed interference scenarios) can occur when the downlink and uplink scheduling of different network entities is not synchronized. Thus, a downlink/uplink mismatch at two network entities (e.g., a base station and a neighbor base station, or a UE and a base station) may result in mixed interference.

Figure 7:
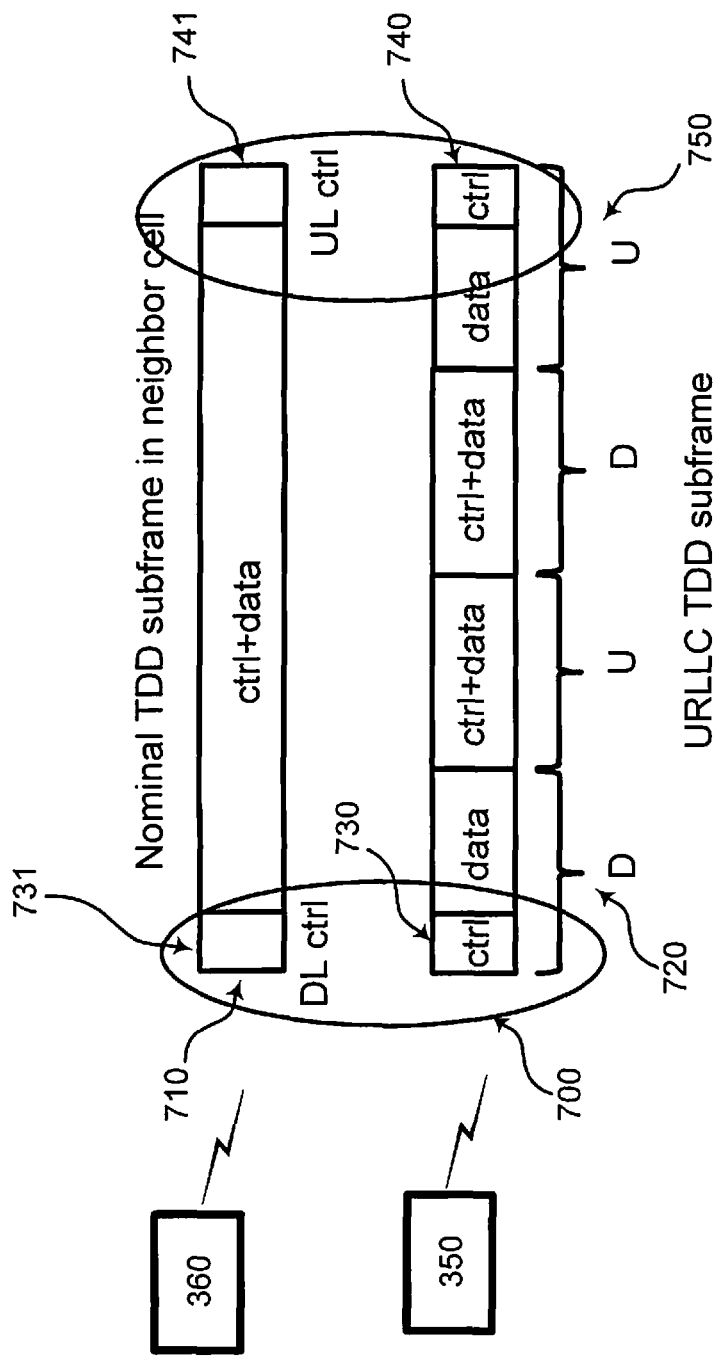
FIG. 7 is a diagram illustrating a network entity configured for control channel alignment for a URLLC TDD subframe configuration in accordance with aspects of the present disclosure.

To facilitate interference management when a network entity utilizes a URLLC TDD subframe configuration, aspects of the present disclosure align the control channels of a URLLC TDD subframe with the control channels of a nominal TDD subframe of a neighbor cell. For example, FIG. 7 illustrates an example where the control channels of URLLC TDD subframe 700 are aligned with the control channels of nominal TDD subframe 710. In particular, network entity 350 may be configured for communication using a URLLC TDD subframe configuration, for example URLLC TDD subframe 700, and network entity 360 may be configured for communication using a nominal TDD subframe configuration, for example nominal TDD subframe 710. During transmission/reception, downlink control channel 730 in downlink interval 720 is aligned with downlink control channel 731 of nominal TDD subframe 710. In some aspects of the present disclosure, the downlink control channels (e.g., downlink control channels 730 and 731) may be physical control channel such as PDCCH or PHICH. By aligning the downlink control channels, mixed interference in the downlink channels of URLLC TDD subframe 700 of network entity 350 and nominal TDD subframe 710 of neighbor cell 360 may be avoided.

As further illustrated in FIG. 7, URLLC TDD subframe 700 may be configured to align uplink control channel 740 in uplink interval 750 with control channel 741 of nominal TDD subframe 710. In various aspects of the present disclosure, the uplink control channels (e.g., uplink control channels 740 and 741) may be physical control channel such as PUCCH. By aligning the uplink control channels of URLLC TDD subframe 700 of network entity 350 and nominal TDD subframe 710 of neighbor cell 360, mixed interference is avoided in the uplink control channel of nominal TDD subframe 710.

In some instances, downlink traffic and uplink traffic may not be symmetrical. That is, there may be more downlink traffic than uplink traffic, or there may be more uplink traffic than downlink traffic. In some cases, a lot more data is transmitted from a base station to a UE on the downlink than the data transmitted from the UE to the base station on the uplink. In this situations, the ratio of downlink traffic to uplink traffic is said to be asymmetrical. As previously discussed, aspects of the present disclosure address such a situation by providing an asymmetric pattern for the URLLC TDD subframe configuration that takes advantage of the asymmetric traffic ratio to further reduce packet transmission delay.

Figure 8:
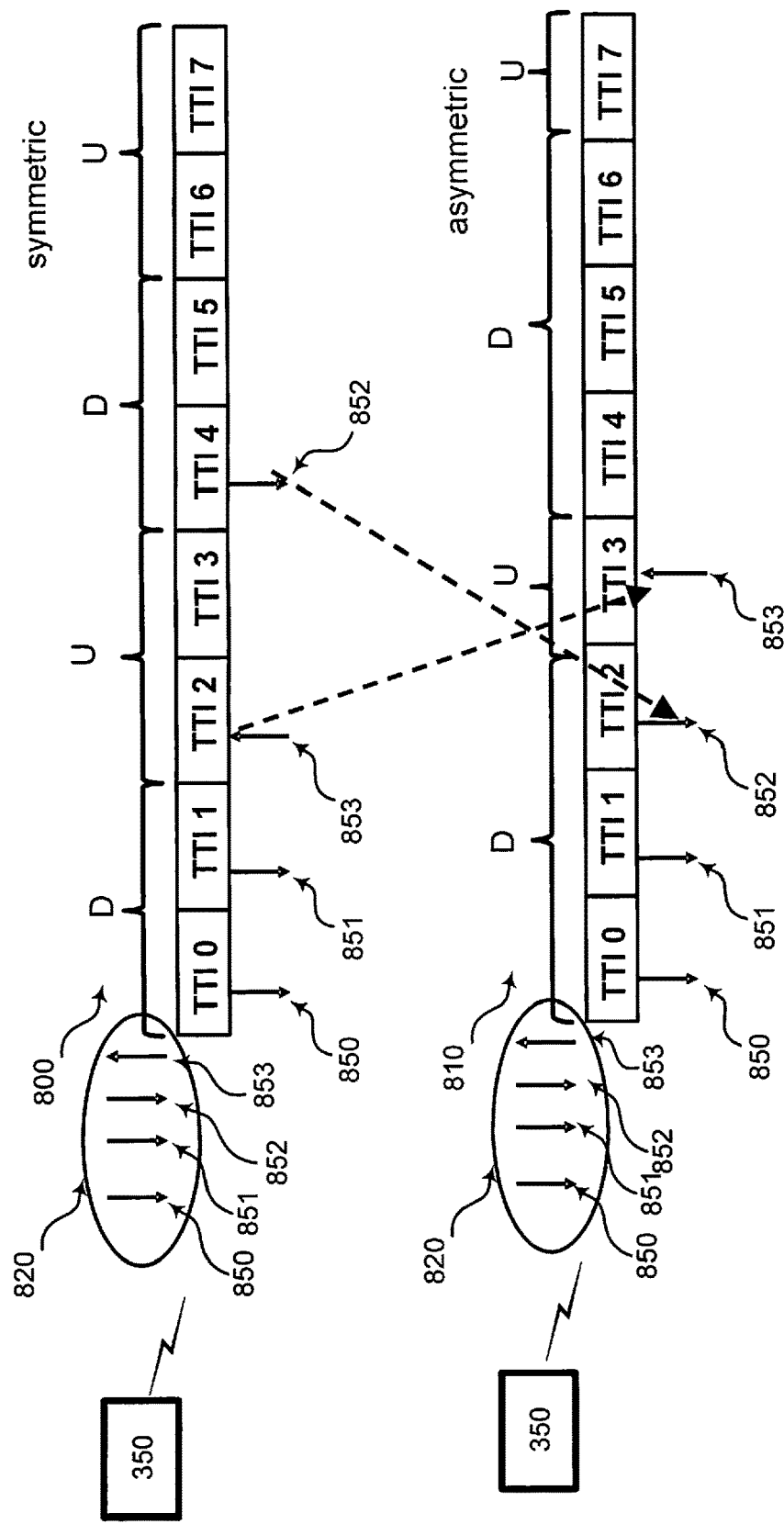
FIG. 8 is a diagram illustrating a network entity configured for asymmetric DUDU configurations for a URLLC TDD subframe in accordance with aspects of the present disclosure.

FIG. 8 shows an example of a symmetric DUDU configuration and an asymmetric DUDU configuration of a URLLC TDD subframe. Symmetric DUDU configuration 800 comprises downlink and uplink intervals having durations of 2 TTIs each. As discussed above in greater detail, the duration of each TTI may vary depending on system requirement. Thus, the duration of the downlink and uplink intervals may also vary, in terms of symbols. A URLLC TDD subframe may be configured with symmetric DUDU configuration 800 when downlink traffic and uplink traffic are relatively equal.

Asymmetric DUDU configuration 810 is also shown in FIG. 8. In the illustrated example, a downlink traffic to uplink traffic ratio of 3:1 has been determined. Those of skill in the art would understand that there are multiple techniques for determining the traffic ratio, and such techniques are not discussed herein as they are beyond the scope of this disclosure. Asymmetric DUDU configuration 810 comprises downlink intervals having durations of 3 TTIs, and uplink intervals having durations of 1 TTI. Thus, asymmetric DUDU configuration 810 is biased to downlink traffic and has a ratio of downlink to uplink of 3:1. A URLLC TDD subframe may be configured with asymmetric DUDU configuration 810 when downlink traffic is heavier than uplink traffic, and in particular, when the downlink to uplink traffic ratio is 3:1, or close to that ratio.

In the example of FIG. 8, network entity 350, such as a base station, performs communications using a URLLC TDD subframe configuration. Downlink packets 850, 851, and 852 arrive at network entity 350 at time 820 for transmission. Uplink packet 853 also arrives at network entity 350 at time 820 for transmission. It is noted that the example of FIG. 8 is discussed herein with respect to a base station, but the illustrated concept would also apply with respect to a UE. In this example, in a URLLC TDD subframe configured with symmetric DUDU configuration 800, downlink packet 850 may be transmitted by network entity 350 during TTI 0, and downlink packet 851 may be transmitted by network entity 350 during TTI 1. As there are only two TTIs per downlink interval, downlink packet 852 will not be transmitted during the current downlink interval and would have to wait until the next downlink interval to be transmitted. After network entity 350 switches to the uplink interval, uplink packet 853 is received during TTI 2. TTI 2 is the third TTI of symmetric DUDU configuration 800. No packet is received by network entity 350 during uplink TTI 3. After TTI 3, network entity 350 switches from the uplink interval to the next downlink interval. Downlink packet 852 is transmitted during TTI 4, which is the fifth TTI of symmetric DUDU configuration 800. Thus, there is a 5-TTI transmission delay for downlink packet 852.

In an alternate aspect, the URLLC TDD subframe may configured with asymmetric DUDU configuration 810. In this case, network entity 350 may transmit downlink packet 850 during TTI 0, may transmit downlink packet 851 during TTI 1, and may transmit downlink packet 852 during TTI 2. TTI 2 is the third TTI of asymmetric DUDU configuration 810 and, in this case, the transmission delay for downlink packet 852 is 3 TTIs. Thus, in this example, there is a reduction of two TTIs in the transmission delay of downlink packet 852. Uplink packet 853 is received at TTI 3, and so there is an increased delay of one TTI for uplink packet 853. However, this increased delay in the uplink packets is less than the decrease in the downlink packets delay. As the traffic is heavier in the downlink than in the uplink, the gain in downlink performance is more desirable than maintaining uplink delays. Therefore, configuring a URLLC TDD subframe with an asymmetric DUDU configuration further reduces packet transmission delay, resulting in a reduced overall system latency and increasing system performance and reliability.

It should be understood that the above asymmetric ratios are merely illustrative and are not intended to limit this disclosure. Thus, other asymmetric ratios may be used. In some aspects of the present disclosure, the asymmetric ratio of an asymmetric DUDU configuration may be based on the determined ratio of the downlink to uplink traffic ratio. For example, the asymmetric ratio of an asymmetric DUDU configuration may be the same as the determined ratio of the downlink to uplink traffic ratio. Alternatively, the asymmetric ratio of an asymmetric DUDU configuration may be a fraction or a multiple of the determined ratio of the downlink to uplink traffic ratio.

In various aspects of the present disclosure, the asymmetric ratio may be determined based on system requirements. The asymmetric ratio of an asymmetric DUDU configuration may be selected from a set of selected asymmetric ratios. Such selected asymmetric ratios may be selected, or generated, based on the latency, traffic load, or reliability requirements of the system. For example, the asymmetric ratio may be determined based on a target transmission delay to be achieved. In other aspects, the asymmetric ratio may be determined based on a traffic load requirement. The asymmetric ratio may also be determined based on a desired latency for transmission of URLLC data. The selected asymmetric ratios may be stored in the memory of the network entity. In some aspects of the present disclosure, a network entity may adaptively switch between different asymmetric DUDU configurations depending on system requirements. For example, a network entity may configure a URLLC TDD subframe with an asymmetric DUDU configuration having a downlink to uplink ratio of 4:2, in response to a determination that the ratio of downlink traffic to uplink traffic is 4:2. In this example, the downlink traffic may increase and thus, the ratio of downlink traffic to uplink traffic may increase to 5:1. In this case, the network entity may switch the URLLC TDD subframe configuration to an asymmetric DUDU configuration having a downlink to uplink ratio of 5:1 to decrease downlink traffic delay.

As discussed above, although a URLLC TDD subframe may be self-contained, only one direction in downlink or uplink may be active at any time. Thus, during uplink intervals, no downlink transmissions are possible. Similarly, during downlink intervals, no uplink transmissions are possible. A network entity operating in accordance with aspects of the present disclosure may be configured to support carrier aggregation using various combinations of TDD and Frequency-Division Duplex (FDD) component carriers (CCs). For example, network entity 350 may support TDD-FDD joint operation. In TDD-FDD joint operation, network entity 350 may comprise at least one TDD CC and at least one FDD CC. Thus, in TDD-FDD joint operation, both the TDD CC and the FDD CC would be available at the same time to network entity 350 for communications. Aspects of the present disclosure utilize the TDD-FDD joint operation of a network entity to provide control anchoring of a URLLC TDD subframe on the FDD CC.

Figure 9:
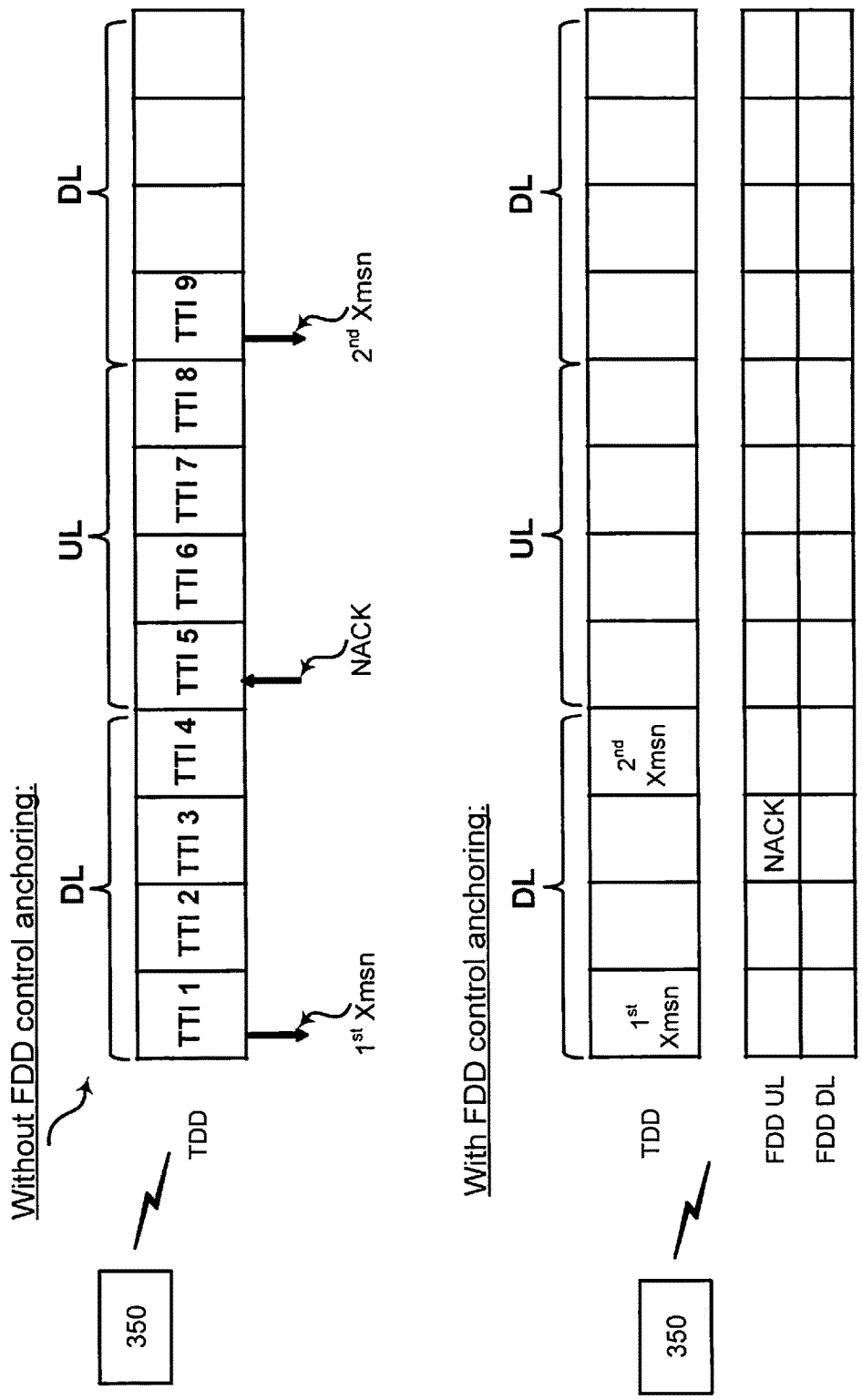
FIG. 9 is a diagram conceptually illustrating a network entity configured for control anchoring on FDD for a URLLC TDD subframe in accordance with aspects of the present disclosure.

FIG. 9 shows an example of network entity 350 configured with control anchoring on FDD for a URLLC TDD subframe. FIG. 9 also shows an example of network entity 350 without control anchoring on FDD. In the example illustrating network entity 350 without control anchoring on FDD, a fixed symmetric DUDU configuration of downlink and uplink intervals with a duration of 4 symbols each, and a TTI with a duration of 1 symbol, is used. In this example, a first transmission of URLLC data from network entity 350 is performed at TTI 1 over the TDD CC. Since no uplink transmission can be received during the downlink interval, a HARQ NACK may not be received until TTI 5. Since no downlink transmission can be made during the uplink interval, a second HARQ transmission of the URLLC data may not be made until TTI 9. Thus, the second HARQ transmission is delayed 9 symbols from the first transmission.

In the example of FIG. 9 illustrating a URLLC TDD subframe configured with control anchoring on FDD, a fixed symmetric DUDU configuration of downlink and uplink intervals with a duration of 4 symbols each, and a TTI with a duration of 1 symbol, is also used. In this example, network entity 350 performs a first transmission of URLLC data over the TDD CC at TTI 1. No uplink transmission can be received by network entity 350 over the TDD during the downlink interval. However, in TDD-FDD joint operation, the FDD uplink CC is always available for uplink reception, because the FDD uplink CC and downlink CC are separate frequency resources that overlap in time. Having received a HARQ NACK, network entity 350 retransmits the URLLC data over the TDD CC at TTI 4. It is noted that control anchoring on FDD enables network entity 350 to retransmit the URLLC data in the same downlink interval as the first transmission. This provides even further reductions to system latency. As illustrated in the example above, the second HARQ transmission is delayed by 4 symbols, whereas without control anchoring on FDD, the second HARQ transmission would be delayed by 9 symbols.

Figure 10:
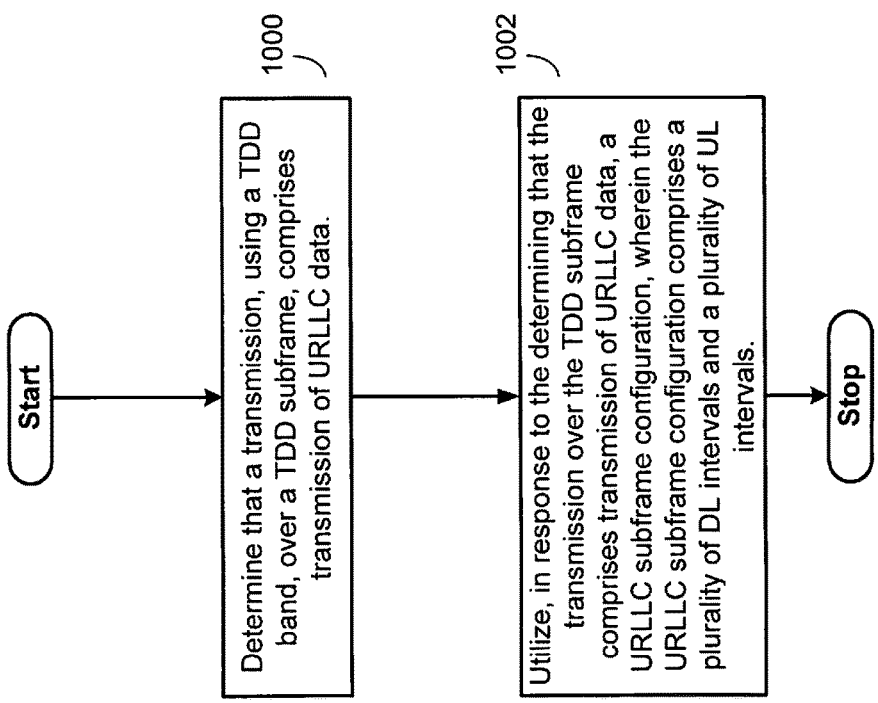
FIG. 10 is a block diagram illustrating example blocks of a process in accordance with aspects of the present disclosure.
Figure 11:
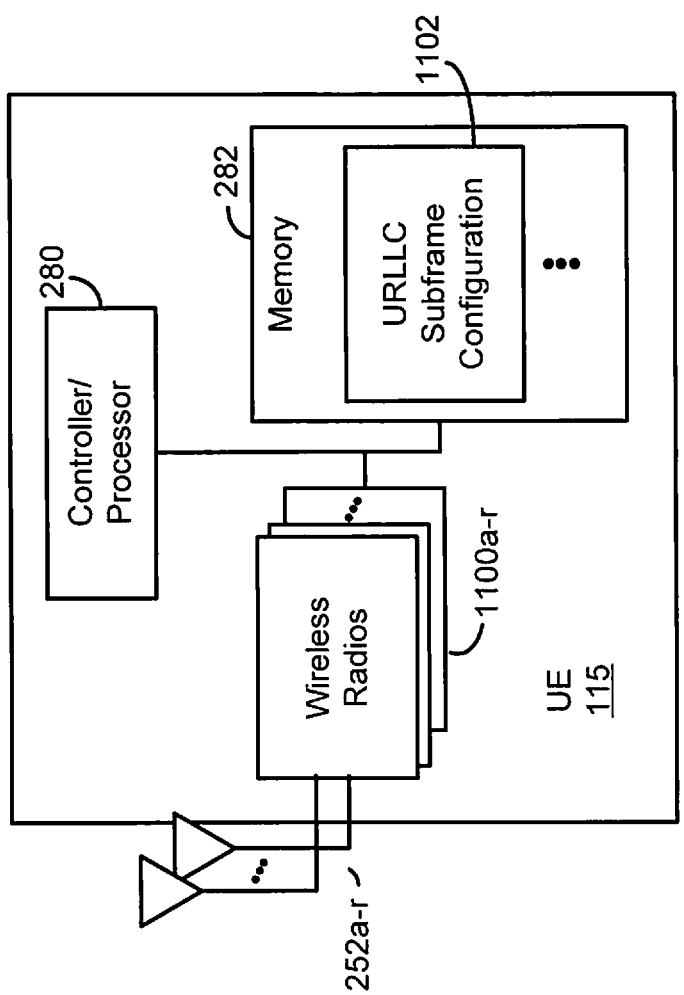
FIG. 11 is a block diagram illustrating a UE configured according to one aspect of the present disclosure.

FIG. 10 illustrates example blocks of a wireless communication process carried out according to one aspect of the present disclosure. The example blocks will also be described with respect to UE 115 as illustrated in FIG. 11. FIG. 11 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1100*a-r* and antennas 252*a-r*. Wireless radios 1100*a-r* includes various components and hardware, as illustrated in FIG. 2 for UE 115, including modulator/demodulators 254*a-r*, MIMO detector 256, receive processor 258, transmit processor 264, and TX MIMO processor 266. It is envisioned that the process of FIG. 10 may be carried out by a network entity, such as a base station or a UE as described above, such as UE 115 of FIGS. 2 and 11.

Beginning at block 1000, a network entity determines whether a transmission, using a TDD band, over a TDD subframe, comprises transmission of URLLC data. For example, UE 115, under control of controller/processor 280, determines whether a transmission for antennas 252*a-r* and wireless radios 1100*a-r* comprises transmission of URLLC data. In some aspects, the transmission utilizes a nominal TDD subframe configuration that comprises a single downlink interval and a single uplink interval.

At block 1002, in response to a determination that the transmission over the TDD subframe comprises transmission of URLLC data, the network entity utilizes a URLLC subframe configuration. For example, in response to UE 115 determining, under control of controller/processor 280, that the transmission for antennas 252*a-r* and wireless radios 1100*a-r* comprises transmission of URLLC data, UE 115 accesses and utilizes URLLC subframe configuration 1102 stored in memory 282. It is envisioned that the URLLC subframe configuration comprises a plurality of downlink intervals and a plurality of uplink intervals.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 10 and 11 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   determining that data scheduled for transmission using a Time-Division Duplex (TDD) band over a TDD subframe includes Ultra-Reliable Low-Latency Communications (URLLC) data;
   transitioning, in response to the determining, from utilizing a nominal TDD subframe configuration to utilizing a URLLC subframe configuration for the TDD subframe, wherein the nominal TDD subframe configuration includes a single downlink interval and a single uplink interval, and wherein the URLLC subframe configuration includes a plurality of downlink intervals and a plurality of uplink intervals, each of the plurality of downlink intervals and each of the plurality of uplink intervals occurring during the TDD subframe;
   transmitting to a wireless apparatus at least a portion of the URLLC data over the TDD subframe, having a URLLC subframe configuration, during the plurality of downlink intervals; and
   receiving an acknowledgment from the wireless apparatus, in response to the transmitted at least a portion of the URLLC data, over a Frequency-Division Duplex (FDD) band, wherein the acknowledgement received over the FDD band is received during the plurality of downlink intervals during which the at least a portion of the URLLC data is transmitted to the wireless apparatus.

2. The method of claim 1, wherein the URLLC subframe configuration further includes at least one control channel interval, and wherein the at least one control channel interval of the URLLC subframe configuration is aligned with a control channel interval of a nominal TDD subframe of a neighboring cell.

3. The method of claim 1, further comprising:
   determining a desired latency for the transmission of the URLLC data; and
   adjusting, based on the desired latency, a transmission time interval (TTI) for the URLLC subframe configuration.

4. The method of claim 3, wherein the adjusting includes adjusting the TTI of the URLLC subframe configuration to be less than a DL interval of the plurality of DL intervals or less than a UL interval of the plurality of UL intervals of the URLLC subframe configuration.

5. The method of claim 1, further comprising:
   determining a traffic load requirement for the transmission of the URLLC data; and
   configuring a ratio of the plurality of downlink intervals to the plurality of uplink intervals of the URLLC subframe configuration to meet the determined traffic load requirement.

6. The method of claim 5, wherein the traffic load requirement of the transmission of the URLLC data indicates an asymmetric downlink transmission to uplink transmission ratio of the transmission of the URLLC data.

7. The method of claim 6, wherein the configuring the ratio of the plurality of downlink intervals to the plurality of uplink intervals of the URLLC subframe configuration includes selecting a ratio from a plurality of asymmetric ratios based on the indicated asymmetric downlink transmission to uplink transmission ratio of the transmission of the URLLC data.

8. The method of claim 7, wherein the plurality of asymmetric ratios includes predetermined ratios of the plurality of downlink intervals to the plurality of uplink intervals of the URLLC subframe configuration stored in memory of the network entity.

9. The method of claim 1, further comprising retransmitting to the wireless apparatus over the TDD subframe, in response to the acknowledgement received over the FDD band, the at least a portion of the URLLC data during the plurality of downlink intervals during which the at least a portion of the URLLC data was initially transmitted to the wireless apparatus.

10. An apparatus configured for wireless communication, the apparatus comprising:
    at least one processor, and
    a memory coupled to the at least one processor,
    wherein the at least one processor is configured to:
       determine that data scheduled for transmission using a Time-Division Duplex (TDD) band over a TDD subframe includes Ultra-Reliable Low-Latency Communications (URLLC) data;
       transition, in response to the determination that data scheduled for transmission includes URLLC data, from utilizing a nominal TDD subframe configuration to utilizing a URLLC subframe for the TDD subframe, wherein the nominal TDD subframe configuration includes a single downlink interval and a single uplink interval, and wherein the URLLC subframe configuration is stored in the memory and includes a plurality of downlink intervals and a plurality of uplink intervals, each of the plurality of downlink intervals and each of the plurality of uplink intervals occurring during the TDD subframe;
       transmit to a wireless apparatus at least a portion of the URLLC data over the TDD subframe, having a URLLC subframe configuration, during the plurality of downlink intervals; and
       receive an acknowledgement from the wireless apparatus, in response to the transmitted at least a portion of the URLLC data, over a Frequency-Division Duplex (FDD) band, wherein the acknowledgement received over the FDD band is received during the plurality of downlink intervals during which the at least a portion of the URLLC data is transmitted to the wireless apparatus.

11. The apparatus of claim 10, wherein the URLLC subframe configuration further includes at least one control channel interval, and wherein the at least one control channel interval of the URLLC subframe configuration is aligned with a control channel interval of a nominal TDD subframe of a neighboring cell.

12. The apparatus of claim 10, wherein the at least one processor is further configured to:
   determine a desired latency for the transmission of the URLLC data; and
   adjust, based on the desired latency, a transmission time interval (TTI) for the URLLC subframe configuration.

13. The apparatus of claim 12, wherein the configuration of the at least one processor to adjust the TTI comprises configuration of the at least one processor to adjust the TTI of the URLLC subframe configuration to be less than a DL interval of the plurality of DL intervals or less than a UL interval of the plurality of UL intervals of the URLLC subframe configuration.

14. The apparatus of claim 10, wherein the at least one processor is further configured to:
   determine a traffic load requirement for the transmission of the URLLC data; and
   configure a ratio of the plurality of downlink intervals to the plurality of uplink intervals of the URLLC subframe configuration to meet the determined traffic load requirement.

15. The apparatus of claim 14, wherein the traffic load requirement of the transmission of the URLLC data indicates an asymmetric downlink transmission to uplink transmission ratio of the transmission of the URLLC data.

16. The apparatus of claim 15, wherein the configuration of the at least one processor to configure the ratio of the plurality of downlink intervals to the plurality of uplink intervals of the URLLC subframe configuration comprises configuration of the at least one processor to select a ratio from a plurality of asymmetric ratios based on the indicated asymmetric downlink transmission to uplink transmission ratio of the transmission of the URLLC data.

17. The apparatus of claim 16, wherein the plurality of asymmetric ratios includes predetermined ratios of the plurality of downlink intervals to the plurality of uplink intervals of the URLLC subframe configuration stored in memory of the network entity.

18. The apparatus of claim 10, wherein the at least one processor is further configured to retransmit to the wireless apparatus over the TDD subframe, in response to the acknowledgement received over the FDD band, the at least a portion of the URLLC data during the plurality of downlink intervals during which the at least a portion of the URLLC data was initially transmitted to the wireless apparatus.

19. A non-transitory computer-readable medium having program code recorded thereon, the program code comprising program code to:

determine that data scheduled for transmission using a Time-Division Duplex (TDD) band over a TDD subframe includes Ultra-Reliable Low-Latency Communications (URLLC) data;

transition, in response to the determination, from utilizing a nominal TDD subframe configuration to utilizing a URLLC subframe configuration for the TDD subframe, wherein the nominal TDD subframe configuration includes a single downlink interval and a single uplink interval, and wherein the URLLC subframe configuration includes a plurality of downlink intervals and a plurality of uplink intervals, each of the plurality of downlink intervals and each of the plurality of uplink intervals occurring during the TDD subframe;

transmit to a wireless apparatus at least a portion of the URLLC data over the TDD subframe, having a URLLC subframe configuration, during the plurality of downlink intervals; and receive an acknowledgement from the wireless apparatus, in response to the transmitted at least a portion of the URLLC data, over a Frequency-Division Duplex (FDD) band, wherein the acknowledgement received over the FDD band is received during the plurality of downlink intervals during which the at least a portion of the URLLC data is transmitted to the wireless apparatus.

20. The non-transitory computer-readable medium of claim 19, wherein the URLLC subframe configuration further includes at least one control channel interval, and wherein the at least one control channel interval of the URLLC subframe configuration is aligned with a control channel interval of a nominal TDD subframe of a neighboring cell.

21. The non-transitory computer-readable medium of claim 19, further comprising program code to:
   determine a desired latency for the transmission of the URLLC data; and
   adjust, based on the desired latency, a transmission time interval (TTI) for the URLLC subframe configuration.

22. The non-transitory computer-readable medium of claim 19, further comprising program code to:
   transmit to a wireless apparatus at least a portion of the URLLC data over the TDD subframe, having a URLLC subframe configuration, during the plurality of downlink intervals; and
   receive an acknowledgement from the wireless apparatus, in response to the transmitted at least a portion of the URLLC data, over a Frequency-Division Duplex (FDD) band.

* * * * *